(12) United States Patent
Ahlen et al.

(10) Patent No.: US 8,018,909 B2
(45) Date of Patent: *Sep. 13, 2011

(54) ARRANGEMENT AND A METHOD IN COMMUNICATION NETWORKS

(75) Inventors: Anders Ahlen, Göteborg (SE); Niklas Sven Lundin, Torslanda (SE); Staffan Winell, Askim (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 721 days.

This patent is subject to a terminal disclaimer.

(21) Appl. No.: 11/574,486

(22) PCT Filed: Aug. 28, 2004

(86) PCT No.: PCT/EP2004/009628
§ 371 (c)(1),
(2), (4) Date: Feb. 28, 2007

(87) PCT Pub. No.: WO2006/024307
PCT Pub. Date: Mar. 9, 2006

(65) Prior Publication Data
US 2008/0316980 A1    Dec. 25, 2008

(51) Int. Cl.
*H04W 4/00* (2009.01)
(52) U.S. Cl. ........ 370/338; 455/560; 455/561; 455/453; 455/349; 370/331
(58) Field of Classification Search .......... 370/331–400; 455/560, 561, 453, 349
See application file for complete search history.

(56) References Cited

U.S. PATENT DOCUMENTS

| | | | | |
|---|---|---|---|---|
| 6,195,705 | B1 * | 2/2001 | Leung | 709/245 |
| 6,804,221 | B1 * | 10/2004 | Magret et al. | 370/338 |
| 6,829,473 | B2 * | 12/2004 | Raman et al. | 455/406 |
| 7,542,447 | B2 * | 6/2009 | Ronneke et al. | 370/331 |
| 2002/0172207 | A1 * | 11/2002 | Saito et al. | 370/400 |
| 2004/0018829 | A1 * | 1/2004 | Raman et al. | 455/406 |
| 2007/0254661 | A1 * | 11/2007 | Chowdhury et al. | 455/436 |

FOREIGN PATENT DOCUMENTS

| WO | WO 02/32062 | * | 4/2002 |
|---|---|---|---|
| WO | WO 2004084572 | | 9/2004 |

OTHER PUBLICATIONS

3GPP TS 23.236.*

* cited by examiner

*Primary Examiner* — Kamran Afshar
*Assistant Examiner* — Shahriar Behnamian

(57) ABSTRACT

The present invention relates to an arrangement comprising a functional server node forming part of a conglomerate, or pool, of functional server nodes in common controlling a number of radio network control means, each functional server node being able to control any, or a number of, radio network control means, to which mobile stations are connected. The functional server nodes support transfer/redistribution of mobile stations between each other without interrupting the connection of the mobile stations, a target functional server node, to which it has been decided that a mobile station is to be transferred from a current functional server node, generates an area update or transfer acceptance message comprising an identification of the current functional server node, an identification of the target functional server node and a transfer indications. The invention also relates to a method of redistributing or transferring mobile station contexts.

33 Claims, 8 Drawing Sheets

ARRANGEMENT AND A METHOD IN COMMUNICATION NETWORKS

FIELD OF THE INVENTION

The present invention relates to an arrangement comprising functional server nodes, e.g. packet data support nodes, forming part of a conglomerate, or a pool, of functional server nodes in common controlling a number of radio networks or radio network control means, each functional server node being able to control any, or a number of, radio network control means, to which mobile stations are connected. The invention also relates to a functional server node and to a method for transferring mobile stations contexts between functional server nodes.

STATE OF THE ART

In communication systems supporting communication of packet data including a number of radio networks and core networks, e.g. a PLMN, each radio network generally comprises radio network control means, comprising one of more radio network control nodes controlling a number of base stations, to which user stations can be connected or attached. Generally a radio network control means, or a radio network control node, is controlled by a packet data support node of the core network. For GPRS/UMTS such a packet data support node is denoted an SGSN (Serving GPRS Support Node). Another support node in such a communication system is the GGSN (Gateway GPRS Support Node) which handles or controls communication with external packet data networks. In systems known today the packet data support nodes, e.g. SGSN:s, control one or more radio network control means, i.e. they are responsible for such radio network control means, for example RNC:s (Radio Network Controller). In many systems it is fixed which packet data support node, e.g. SGSN, controls which RNC(s). Systems in which the packet data support functionality is provided by non-split, single nodes are (here) denoted monolithic systems. In other systems (split up architectures) a packet data support node, particularly an SGSN, is split up in two "sub-nodes", namely an SGSN server and another sub-node denoted media gateway (MGW) wherein the SGSN server node handles user plane functionalities. However, redundancy issues are problematic in such a system, as in other pooled and non-pooled systems, since if an SGSN is malfunctioning, packet communication will fail unless another SGSN can be allocated or a redundant SGSN can be provided for. Generally, as a subscriber performs an attach procedure to the network, the RNC controlling the base stations it connects to, passes the attach request to the SGSN it is connected to, i.e. which SGSN that is used can be said to be based on the location of the subscriber.

This gives rise to problems also as far as load sharing is concerned, which generally is not handled in any satisfactory manner. As an example, at rush hours a large number of subscribers move in one and the same direction, since the selection of SGSN is location dependent, i.e. it depends on which radio network the subscriber has attached to, the SGSNs in such areas run the risk of being overloaded whereas other SGSNs hardly are used at all. Later and/or earlier the situation may be the opposite. This means that the SGSNs have to be dimensioned for the "worst case". Moreover, as a subscriber is roaming within the network such that the closest base station will be controlled by another radio network control means that the one he attached to, and hence the SGSN which is responsible for a particular radio network control means is statically configured, the responsibility for the connection will be taken over by another SGSN etc. This involves a lot of signalling e.g. with the home location register node (HLR) of the subscriber, i.e. it requires HLR updates, which means a load on the HLR and it involves a lot of signalling. To make reconfigurations and to add equipment in such a system will also involve high costs and much configurational work. Still further high costs are involved when such a system needs to be built out, i.e. when new nodes or nodes with a greater capacity, or nodes replacing malfunctioning servers, need to be added. Such solutions are disadvantageous as far as load sharing is concerned, and packet data support node redundancy is not provided for to a sufficient extent, network configuration work gets expensive, time consuming and complicated. In addition thereto packet data support nodes are associated with specific radio network control means which means that, for a roaming subscriber, the responsibility for such a subscriber by a packet data support node will be transferred to other packet data support nodes as the subscriber moves throughout the network. This leads to a lot of signalling between packet data support nodes and home location register nodes of the subscriber in order to update involved nodes (HLR-nodes, SGSN-SGSN, SGSN-GGSN) which puts a high load on e.g. the home location register node and requires a lot of signalling in general. This problem gets even more serious if, at given time, a plurality of subscribers moves substantially along the same path cf. rush hour traffic. Therefore an improved split up architecture solution has been suggested in the Swedish Patent Application No. 0003719-2, filed on Oct. 13, 2000, and the content of which herewith is incorporated herein by reference.

This document shows a communication system with a split up architecture in which at least some of the packet data support nodes are divided into a functional server node (FSN) and a functional user gateway node (UGN). Alternatively the functional server node functionality, i.e. the control plane functionalities, of a number of packet data support nodes, i.e. functional server nodes, are provided in a pool; no functional user gateway nodes being provided. A number of functional server nodes are provided to, in common, control at least a number of routing areas served by different radio network control means. These functional server nodes are arranged to form a pool of functional server nodes and each of the functional server nodes in a said pool is able to control any of the radio network control means.

However, when several core network nodes support the same Radio Access Network (RAN), known as pooling of nodes as discussed above (for split up as well as monolithic structures), a mechanism is generally needed to transfer terminals from one node to another e.g. for load sharing purposes. This is applicable when a node needs to be taken down for service. It is also applicable when a node is introduced (either new or restarted) into the pool and terminals should be transferred to it to more quickly balance the load within the pool. Otherwise it may take a very long time before the pool gets balanced again, due to the fact that terminals remember their P-TMSI (Packet Temporary Mobile Subscriber Id) at power off. They always return to their previous SGSN at power on, even if a new, less loaded SGSN has been added to the pool (on the assumption that the terminal is still within a routing area within the pool area).

In earlier solutions, in a pooled environment, terminals were exclusively distributed among the pooled core nodes by the RAN. This is done when a terminal either powers on or is asked by the network to re-connect. There were no mechanism to transfer a terminal to another node without breaking the connection of the terminal and therefore the user service.

To move a terminal from a node, these known mechanisms required that the terminal moves out from the pool and back again. Since the idea with a pool is to keep terminals as long as possible within the pool, there is normally a small fraction of terminals doing this. This was the only way to redistribute and balance the load and it takes quite some time, especially for new/restarted nodes, to take an equal share of the terminal load in the pool. For making a pool of nodes functioning well, a faster mechanism which can be controlled by the network operator to redistribute terminals between nodes is suggested in PCT/EP03/02944 filed on Mar. 20, 2003 by the same applicant as the present invention and the content of which herewith is incorporated herein by reference. This document shows a procedure which makes it possible to trigger e.g. an ISRAU (Inter SGSN Routing Area Update) of an MS in a controlled manner between SGSNs in a pool. This, however, requires proprietary signalling between e.g. SGSNs (or more generally packet data support nodes or functional server nodes) in a pool, which may be somewhat complex.

The pool concept is described in 3GPP Standard TS 23.236, which herewith is incorporated herein by reference.

SUMMARY OF THE INVENTION

What is needed is therefore an improved and less complex mechanism, i.e. an arrangement, a functional server node and a method through/by which mobile stations can be transferred to other nodes within the conglomerate or pool of nodes without affecting the connection for the end user terminal. Particularly an arrangement and a functional server node, e.g. a packet data support node is needed which is able to transfer terminals to other nodes, e.g. when the node needs to be taken down for service or similar. A solution is also needed through which terminals can be transferred to a newly introduced node in the pool; it may relate to a "new" node, or to a restarted node, among others in order to distribute the load between the nodes within the conglomerate/pool. A solution is particularly needed through which it can be provided for load sharing, balancing the load as desired, among the nodes.

A solution is also needed through which mobile stations or terminals can be transferred from a node which is taken down, either for maintenance or because it is malfunctioning, or which is overloaded or running the risk of being overloaded. A solution is also needed through which mobile stations can be transferred/redistributed in a fast and easy manner, without substantially deteriorating the service offered to the end user.

Still further a solution is needed through which mobile stations or terminals can be transferred to substantially any selected node within the pool/conglomerate, and through which the transfer(s) may be performed in a scheduled manner. Further yet a solution is needed through which mobile stations can be transferred between nodes with minimized (or no additional) signalling as compared to the case when a mobile station is not transferred. Particularly a solution is needed through which all mobile stations can be transferred from a node (to one or more other nodes) when needed and without impact on the end users concerned.

Even more particularly a solution as referred to above is needed which is applicable also for shared networks, if several operators are concerned, e.g. have one or more radio networks in common, while there being different core networks. A method is also needed through which one or more of the above mentioned objects can be achieved.

Particularly, in a shared network scenario, a solution is also needed for taking care of redirection/redistribution of mobile stations having been directed or transferred to the wrong node, e.g. a node where the mobile station is not a subscriber or where there is no agreement with the subscriber's operator etc.

Therefore an arrangement, a node and a method respectively having the characterizing features of the respective independent claims are provided.

Preferred, or advantageous, embodiments are given by the subclaims.

Throughout this document the Functional Server Node (FSN) which can be part of a pool or conglomerate arrangement, can be either a packet data support node (e.g. an SGSN or a CGSN i.e. a combined packet data support node, e.g. a CGSN which supports also GGSN functionalities) (with integrated control plane and user plan, i.e. in a monolithic architecture), or a packet data support node handling only control plane functionality, (e.g. SGSN server or a CGSN server) in a split up architecture, or an MSC.

BRIEF DESCRIPTION OF THE DRAWINGS

The invention will in the following be further described, in a non-limiting manner, and with reference to the accompanying drawings, in which.

DETAILED DESCRIPTION OF THE INVENTION

Figure 1:
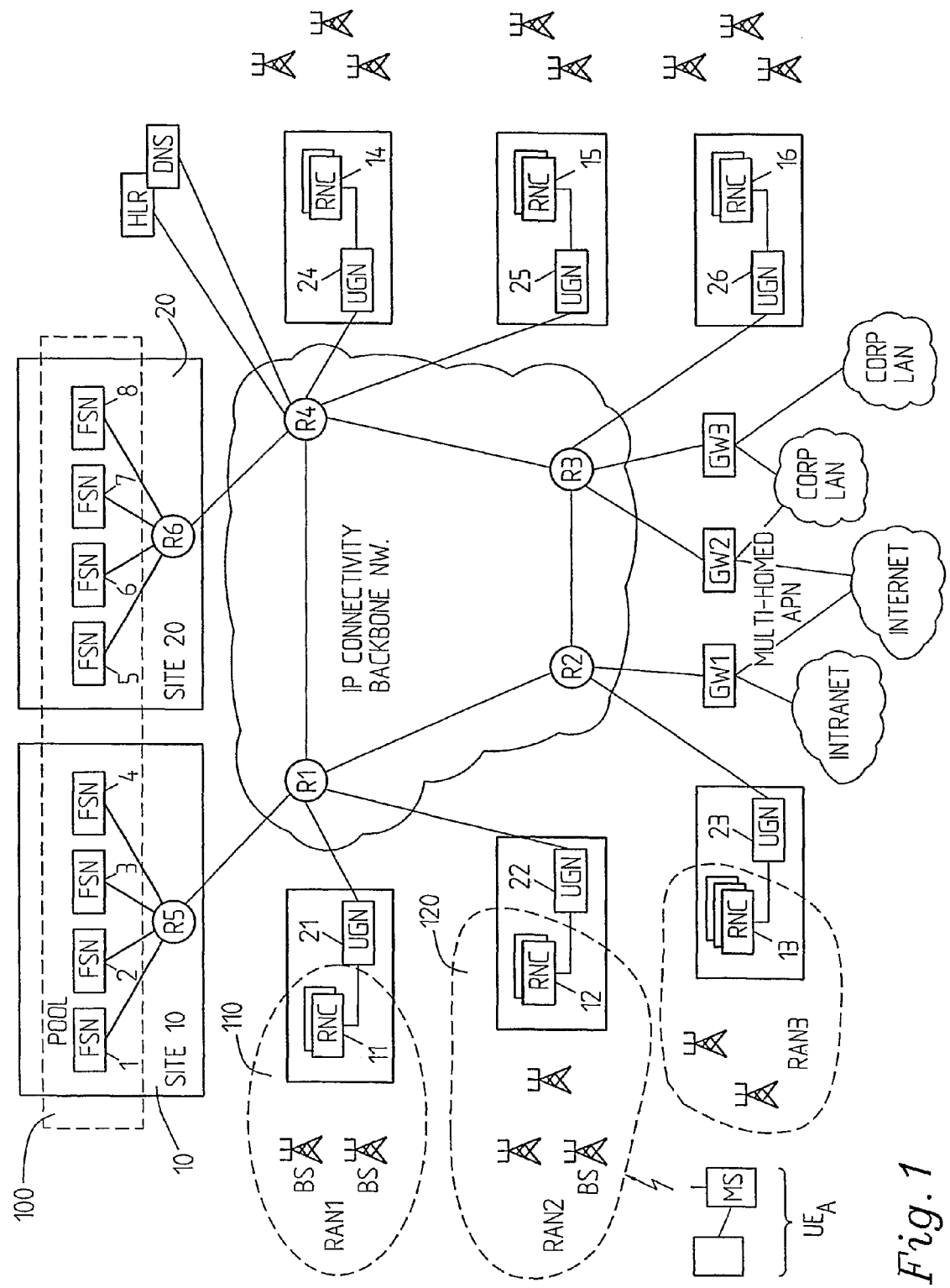
FIG. 1 schematically illustrates a communications system with a pool of functional server nodes.
Figure 2:
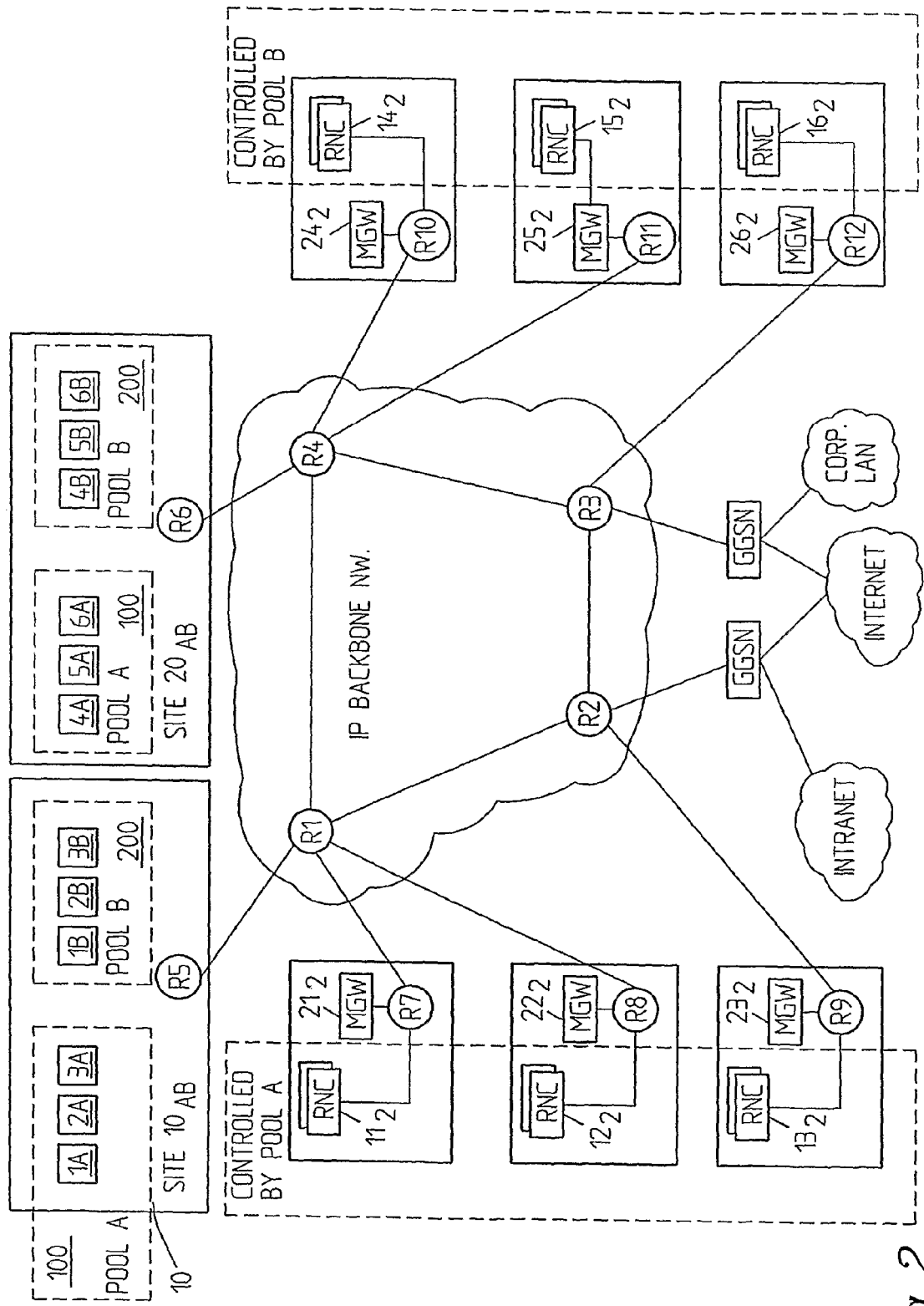
FIG. 2 illustrates an implementation with two pools with functional server means.
Figure 3:
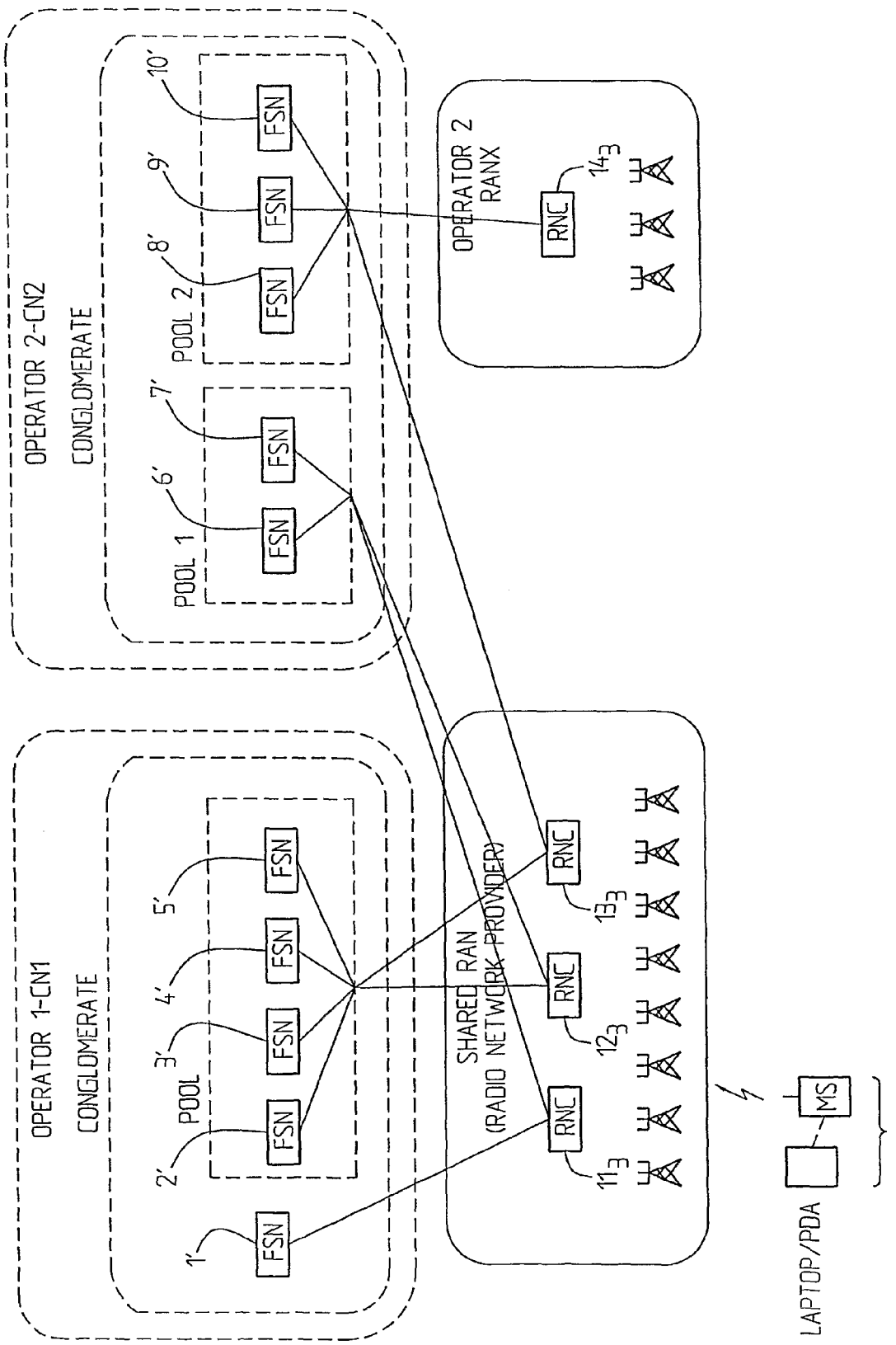
FIG. 3 illustrates an implementation with shared networks, FSN being either an SGSN or an SGSN Server or a CGSN or a CGSN server.

FIGS. 1-3 show examples on communication systems or networks wherein the inventive concept can be implemented and which implement pools or conglomerates respectively of functional server nodes.

FIGS. 1 and 2 show so called split (up) architectures in which the functionality of a packet data support node is split in two nodes.

FIG. 3 shows a monolithic architecture, i.e. there is no split but the entire functionality is provided by a single node. It should be clear that particulars of FIGS. 1, 2 can be implemented also in monolithic architecture, and, vice versa, that particulars of FIG. 3 can be implemented in a split architecture.

Figure 4:
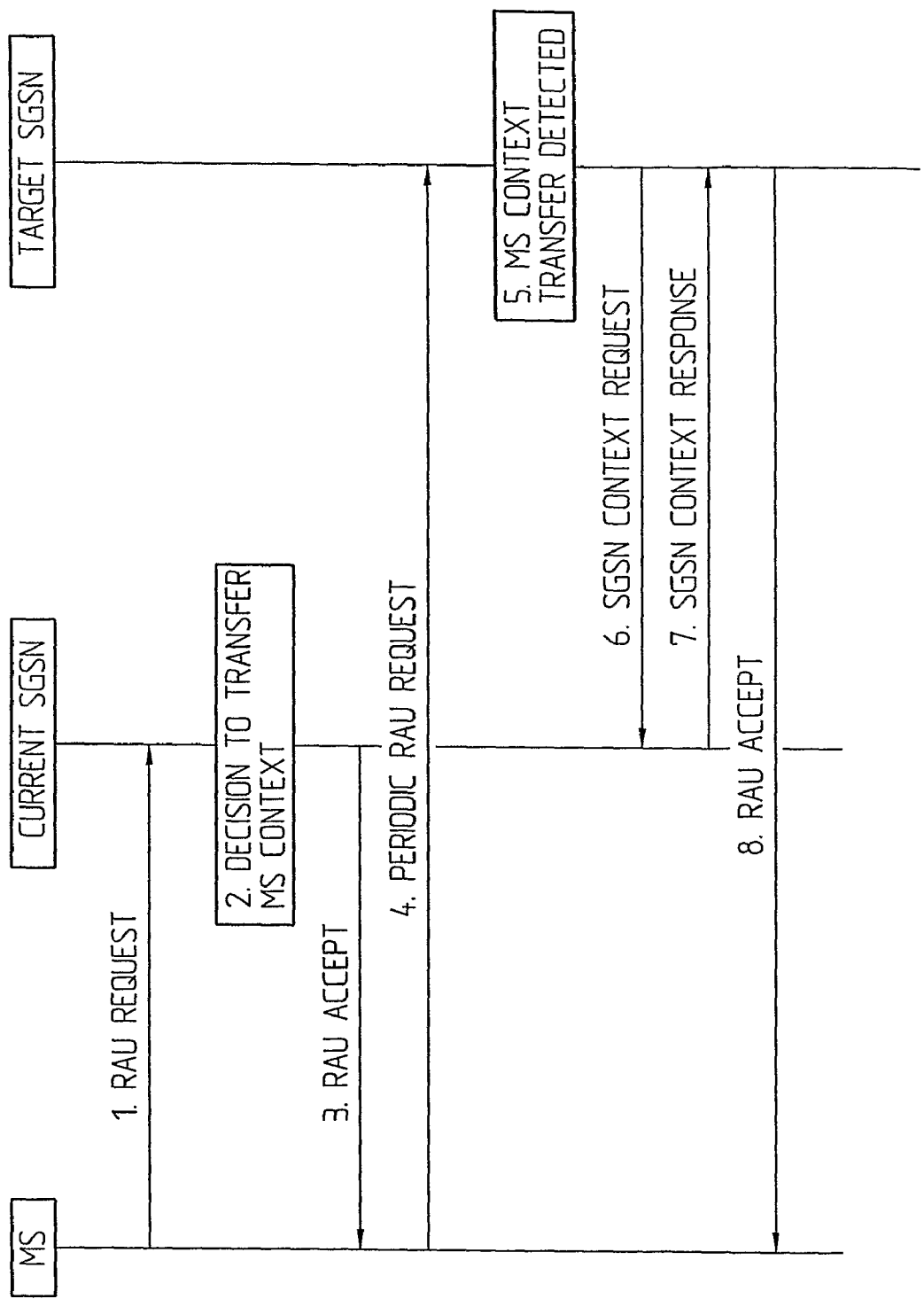
FIG. 4 is a sequence diagram for an implementation for packet switched traffic.

FIG. 4 shows an example of an environment with shared networks implementing conglomerates, i.e. there are different operators involved.

More specifically FIG. 1 shows a communication system (e.g. GPRS or UMTS) supporting communication of packet data. It comprises an IP connectivity backbone network and a number of radio neworks RAN1, RAN2, . . . , RAN6 (only RAN1-RAN3 explicitly indicated). Each radio network comprises a number of base stations BS which are controlled by radio network control means RNC 11, . . . , RNC 16 respectively. In the figure user equipment station (mobile station) UE$_A$ is illustrated which e.g. comprises a computer connected to a mobile station MS$_A$ which here connects to RAN2. In this application mobile station is taken to mean a UE or a MS etc. Packet data support node functionality is provided by functional server nodes FSN and user gateway nodes UGN respectively. Thus, a number of decomposed packet data support nodes are provided as FSN 1-FSN 8 and UGN 21-26.

The functional server nodes FSN 1, ..., FSN 8 are provided in a pool 100 and they share the responsibility for the control of, here, all the radio networks RAN1, ..., RAN6 meaning that any FSN of the pool is able to control any of the radio networks. In this embodiment the functional server nodes are provided at two different sites, site 10 and site 20 respectively, for redundancy reasons, which is clearly advantageous if for example one site is destroyed e.g. due to fire or sabotage. Of course there may be more than two sites and it is of course also possible to keep all the functional server means at a single site. Other alternatives are also possible. In this embodiment FSN 1, ..., FSN 4 are provided at site 10 whereas FSN 5, ..., FSN 8 are provided at site 20. It should be noted that in this case all the functional server nodes are provided in a common pool. It is also possible to have more than one pool depending for example on geographical and practical considerations. FSN 1, ..., FSN 4 are connected to router R5 which in turn is connected to router R1 of the backbone network which is in direct or indirect communication with the other routers of the backbone, here R2, R3, R4. In a similar manner FSN 5, ..., FSN 8 are connected to router R6 at site 20 which in turn communicates directly with router R4 of the backbone network. The routers on the links of the backbone network as well as routers at the respective sites may be arranged in any appropriate manner. It is also possible to provide for redundant routers and links in the backbone network.

Packet data gateway support nodes GW1, GW2, GW3 are provided for connection to external packet data networks such as Internet, intranets and corporate LANs. The connection to an external network can be done through one or more GW:s. If there are more than one gateway to an external network a selection of gateways is needed at each connection activation. The home location register HLR and domain name server DNS are connected to connectivity backbone via router R4, but they can of course be connected in any other appropriate manner.

The radio network control means RNC 11, ..., RNC 16 are responsible for selecting a functional server node when a subscriber connects/attaches to the network. Thus, when user equipment UE$_A$ initiates an attach or connect procedure to be attached to the network via a base station of RAN2, RNC 12, which controls RAN2, is responsible for selecting a functional server node FSN. In principle RNC 12 may select any of the FSNs of pool 100 to control the subscriber of user equipment UE$_A$. It is here supposed that RNC 12 selects FSN 3. Advantageously the selection of FSN is done taking load sharing. FSN status etc. into consideration.

The selection can be performed in different ways, for example a Weighted Round-Robin WRR selection method with reject possibility may be used. This generally means that for each selected, i.e. for the next connecting subscriber, RNC 12 would select for example FSN 4. A weighting factor in a WRR selection method may be a factor which takes the capacity (configured capacity) of each FSN server into account. The actual load on the FSN can also be included in the weighting factor as other factors as well. An FSN server may be provided with the possibility of rejecting a request by an RNC and then the RNC will try another FSN server node. In an advantageous implementation the selection method also includes the possibility to return information in a reject message, e.g. the cause for the rejection, the current load status of the concerned functional server node etc. Advantageous each RNC keeps information about the status of the different FSN servers and inputs this to the selection algorithm.

An RNC may keep information about which FSN server a user equipment station previously has used. This information can then be used when a detached user reattaches and the FSN be reused, which however not always is advantageous, and through the present inventive concept it is suggested how to transfer/redistribute mobile stations after such events (among others). The information is preferably only stored in an RNC for a given time period, otherwise the storing capacity would have to be unnecessarily high and too old information is generally not useful.

In one embodiment statistics relating to the number of rejects or reasons for rejections etc. by different FSN's is kept in the RNC:s. It is also possible to keep such information in an FSN or in both RNC and FSN. The information can be used to indicate the current capacity and to trigger a capacity increase. Which FSN that is allocated or selected for a particular subscriber or user station, is independent of where in the network the subscriber is. A change of FSN:s may however be needed if the subscriber or user station moves to other routing areas or radio networks, if the FSN needs to be taken down, is broken, if new sparsely loaded FSNs are introduced or if an MS is routed to the wrong FSN etc. as discussed above. The by FSN temporarily assigned user station (UE) identity (P-TMSI) is stored in the user station at detach and power off. Different ways to code FSN into user station identity can be used, e.g. by some bits identifying FSN etc.

According to the pool/conglomerate concept, since all FSN servers (FSNs) have substantially the same or identical configuration, the operation and maintenance costs are much lower than in other systems and it also makes it easier to add more capacity e.g. through adding a new FSN. The parameter and software configurations of the FSN:s are advantageously more or less identical. The hardware configuration may of course be different, capacity may differ etc.

If there are more than one pool serving the network, then all FSN:s within a pool particularly have identical parameter and SW configuration. Since there are always alternative FSN:s that can be used if a complete node fails, redundancy on network level is obtained and the redundancy requirements on the FSNs themselves are less stringent than the requirements on server nodes/packet data support nodes in other systems. This is further emphasized through the redistribution/transferring capability concept according to the present invention. When the packet data support nodes are divided into two functional nodes, the functional server means (nodes) generally handle the control plane functionalities whereas the user gateway nodes handle the user plane functionalities.

In an advantageous embodiment, when an RNC has selected a functional server node FSN for a user station or a subscriber attaching to the network, the allocated or selected FSN is responsible for selection of a user gateway node. Particularly each FSN server within a pool can communicate with any user gateway node UGN in the network (or the part controlled by the pool), and each user gateway node UGN can be used by any functional server node FSN in the network of the pool. The FSN may "select" the UGN connected to the RNC it communicates with; i.e. by which it was selected. (Then there is a 1:M relationship between user gateway node UGN and radio network control means RNC.)

Alternatively an FSN may select UGN more freely. In one implementation an algorithm is used according to which the nearest UGN is tried first. Then there is a M:N relationship between UGN and RNC. This is advantageous in so far that is also provides for UGN redundancy. The UGN closest to the concerned RNC may e.g. be selected first to minimize backbone capacity usage and if this UGN is not available or if it rejects the request, another UGN is selected. In case of a reject, a weighted Round-Robin algorithm may be used to select an alternative UGN. If UGN is selected without restrictions, at least to some extent, or if more than one UGN is selectable, this provides for redundancy on a network level as far as functional user gateway nodes are concerned and there will always be an alternative UGN that can be used if a complete UGN fails. The redundancy requirements on such nodes will also be less stringent. It is also advantageous in that upgrading operations are facilitated e.g. when one UGN node is taken out of traffic. It may be an option to use the same UGN until deactivation or detachment.

The selected functional server node may be responsible for selecting between several gateway nodes to external packet data networks such as for example Internet or an intranet for multi-homed APNs (Access Point Name). The nearest gateway node may be selected first or alternatively some algorithm may be used e.g. the weighted Round-Robin algorithm. In one particular implementation load and/or capacity considerations are included in the algorithm. Thus it can be provided for redundancy on network level also as far as gateway node to external network is concerned. There will always be alternative nodes to use if a complete gateway node fails and redundancy requirements will be less stringent on such nodes than in other systems. It is also easy to upgrade such nodes e.g. by taking nodes out of traffic etc.

In one particular implementation the packet data support nodes comprise SGSNs (Serving GPRS Support Node) which are divided or decomposed into an SGSN server node and a media gateway (MGW) and the gateway nodes GW comprise GGSN:s (Gateway GPRS Support Node). An UGN, or particularly a media gateway, may be connected to a router which is in connection with an RNC of the radio network and with a router of the IP backbone network. In this way redundant MGWs are implemented.

For explanatory reasons the splitting up of an SGSN node into an SGSN server and a media gateway MGW will be more thoroughly explained. An SGSN normally handles a large part of user and control plane functions. When split up, the SGSN server node will handle all the signalling interfaces (Gs, Gr, Gd etc.) as well as the GTP-C protocol whereas the MGW will handle the user traffic, and in particular the GTP-U protocol. Thus the load, in monolithic implementations supported by the SGSN, will in a split up architecture be distributed over two different network elements, e.g. SGSN server node and MGW. A new interface is introduced between SGSN server node and MGW. Particularly the functions of the SGSN server node are session management, mobility management, GTP-C termination, MAP termination, RANAP termination, CDR handling, media gateway selections, GGSN-selection, provision of intercept related information. The protocols referred to above, GTP-C, GTP Control Plane, GTP meaning GPRS Tunneling Protocol, MAP, RANAP (Radio Access Network Application Protocol) are discussed in 3GPP, 3G TS 23.060 v3.4.0 (2000-07).

It should be clear that the concept is also applicable for CGSNs which also may be pooled (in split with e.g. a MGW or monolithic implementations).

The media gateway node includes the functionalities of GTP-U (GTP User Plane) termination, collection of usage information for charging and network surveillance purposes, reporting of usage information on demand or event to the SGSN server node or other nodes, provision of content of communication etc.

The MGW handles the user plane functionality for GPRS and terminates the GTP-U tunnels towards the GGSN over the $G_N$ and $G_P$ interfaces and towards the RNC over the Iu interface. The MGW is controlled by the SGSN server.

FIG. 2 shows another implementation of a system in which the inventive concept can be applied. It is here discussed with reference to UMTS, but it is generally applicable to any system and particularly any system wherein the protocol between the radio network and the packet data support node can be divided between control plane functionalities and user plane functionalities.

SGSN server nodes are provided in two different pools, pool A 100 and pool B 200 respectively. The functional server nodes, particularly SGSN server nodes 1A, 2A, 3A of pool A 100 are located at site $10_{AB}$ whereas functional server nodes 4A, 5A, 6A of pool A 100 are located at site $20_{AB}$. Correspondingly functional server nodes 1B, 2B, 3B of pool B 200 are located at site $10_{AB}$ whereas functional server nodes 4B, 5B, 6B of pool B 200 are located at site $20_{AB}$. Functional server means of one and the same pool are located at different sites for reasons of redundancy in case a site is destroyed, or is taken out of operation for some other reason, RNCs $11_2$, $12_2$, $13_2$ are here controlled by pool A whereas RNCs $14_2$, $15_2$, $16_2$ are controlled by pool B. Here all media gateways $21_2$, $22_2$, $23_2$, $24_2$, $25_2$, $26_2$ are connected to routers R7, R8, R9, R10, R11, R12 respectively enabling the use of redundant media gateways. It should be noted that MGW $25_2$ is connected both to RNC $15_2$ and to R11, which is an alternative that also could be represented elsewhere, of course R11 might be connected as e.g. R10. In other aspects the figure is similar to FIG. 1.

It is possible to, instead of one pool at two sites (FIG. 1), or two pools sharing two sites, have one pool at one site only; however then redundancy is not as good, or two pools at only one site, three pools sharing two sites or three sites or any other convenient constellation. Particularly two or more sites may be co-located but still separate. Alternatively two sites have entirely different locations.

The number of FSN:s (SGSN or CGSN servers) can be changed arbitrarily without affecting the network structure. Particularly, if the number of subscribers increases, simply more FSN:s (SGSN servers) are added—there is still no need to add UGN:s (MGW:s), RNC:s, BS:s etc.

FIG. 3 shows a network implementation to which the inventive concept can be implemented, a shared RAN with (here) two different operators, Operator 1, Operator 2 with each a Core Network, CN1, CN2. The shared RAN here comprises RNCs $11_3$, $12_3$, $13_3$ and a number of base stations etc. over which communication is provided with User Equipment UE as described in the foregoing.

FIG. 3 illustrates a monolithic implementation and the FSN:s may comprise SGSNs/CGSNs.

As can be seen from FIG. 3, an operator (here Operator 2) may use a mix of shared and "own" RANs (RANX is here the "own" RAN with RNC $14_3$ of Operator 2). An operator may also use only shared RANs, an example hereon is Operator 1.

CN1 here comprises a conglomerate of FNSs, here FNS 1', FSN 2', FSN 3', FSN 4', FSN 5' of which FSN 2'-FSN 5' form part of a pool whereas TSN 1' is not pooled, but still assigned an NRI (Network Resourse Id) (in order to make routing in the shared RAN function).

CN2 of Operator 2 also comprises a conglomerate of FSNs, here comprising a first pool, pool 1, comprising FSN 6', FSN 7', and a second pool, pool 2, here comprising FSNs, FSN 8', FSN 9' and FSN 10'. A conglomerate is here taken to mean the FSN nodes of an operator. It may also comprise the FSN nodes of different operators. A shared RAN may be operated by a separate company, e.g. a Radio Network Provider. It may of course also be run by Operator 1 or 2 or both.

A conglomerate may e.g. also be taken to mean all FSNs 1'-10' (i.e. FSNs of different operators) connected to an RNC connected to more than one FSN, thus requiring that the FSNs have unique NRIs (Network Resource Identifier).

In FIG. 3 all FSNs are required to have a unique NRI. (An NRI is assigned to an FSN and provisioned to the MS when the MS is given a (P)-TMSI.)

FIG. 4 is a sequence diagram illustrating the signalling flow (for packet switched communication) when a node, here current SGSN, requests/asks another node, target SGSN, to take over responsibility for a mobile station, MS.

In a pool, each functional server node, here particularly each SGSN, has a unique identity, NRI (Network Resource Identifier). The NRI is coded as a part of the mobile station (MS) P-TMSI, and it (NRI) is used by the radio network to route MS traffic to the correct SGSN in the pool.

According to the present invention, the NRI of the first, current, SGSN, as well as the NRI of the second, target, SGSN are encoded into the P-TMSI. This allows the second, target, SGSN to find the first, current, SGSN and perform a standard ISRAU (Inter SGSN Routing Area Update).

Thus, according to the embodiment of FIG. 4 the procedure is as follows:

1. A RAU Request is received in the current SGSN from an MS within the SGSN pool area. In one embodiment it is a periodic RAU request. Alternatively all RAU requests are "catched" (in order to be able to, once the decision (step 2) is taken, in the SGSN to keep control of the MS. At reception of registration requests, it is e.g. possible to set a timer with a very short time out period, e.g. 2 seconds. Service requests etc. are ignored. However, this relates to specific implementations and various alternatives are possible to keep control of an MS, e.g. that it does not move again etc. before the transfer is completed.

2. A decision is taken to move, or transfer, the context of the MS to the target SGSN. The decision may be taken by a person on an O&M (Operation and Maintenance) level, or automatically e.g. by a pool supervising function e.g. monitoring the load on the nodes in the pool, malfunctionings etc. It may be a decision to move a number of MS contexts for some purpose or for some reason, or it may be a decision to move a specific mobile station context.

3. If the RAU is accepted (e.g. authentication is successful) a RAU accept message which is modified, as compared to conventional RAU accept messages, is generated. The following data is encoded in the new P-TMSI to be sent to the MS:NRI of target SGSN, NRI of current SGSN and preferably a transfer indication, which particularly comprises the setting of a move or transfer bit (or bits). Other alternatives are also possible. Particularly the NRI bits of the target SGSN are set in the "normal" or conventional position for NRI of the P-TMSI, whereas another position in the P-TMSI is used for NRI of the current SGSN. Preferably a timer, particularly the periodic RAU timer is set to a very low value, i.e. a short time period, e.g. 2 seconds. (Of course this value is only given as an example, it might be shorter as well as longer; the main thing being that it is considerably shorter than the "normal" value of the periodic RAU timer which may be about 1 hour. The RAU accept message is then sent to MS.

For UMTS the follow-on flag should be ignored and the Iu connection released (otherwise messages will continue to be routed in RNC to the current SGSN and not to target SGSN as long as the Iu connection is active).

For GSM force to standby could be used. When the MS has accepted the new P-TMSI all signalling for UMTS and all traffic (signalling and data) for GSM will be routed to the new target SGSN.

4. The MS will subsequently issue a periodic RAU request. If the periodic RAU timer has been set to a low value, the periodic RAU request will be issued shortly, after e.g. 2 seconds, upon expiry of the timer, which is very advantageous, since it minimizes the risk that the MS will move or perform some action in the meantime, i.e. after the transfer decision has been taken, but before the transfer is completed. Since NRI of the target SGSN is known (included in the RAU Accept message), the periodic RAU request will be routed to the target SGSN by the NRI routing functionality in the relevant RAN node (BSC/RNC).

5. The target SGSN comprises detecting means, e.g. comprised in the control means generating the modified acceptance message, and hence the incoming Periodic RAU request will be recognized as a RAU request from a mobile station selected for a context move operation. Particularly the detection is enabled through the transfer indication, although also other ways of detection are possible. Target SGSN will perform an ISRAU.

6. In the target SGSN, the NRI of the current SGSN is extracted from the P-TMSI of the MS (e.g. also by the control means) and an SGSN Context Request is sent to the current SGSN.

7. The current SGSN then responds to the SGSN Context request.

8. The target SGSN returns a Routing Area Update accept to the MS. This message concludes the ISRAU procedure, and the periodic RAU timer is reset to a normal value.

The terminology etc. used in FIG. 4 generally refers to packet switched communication.

Figure 5:
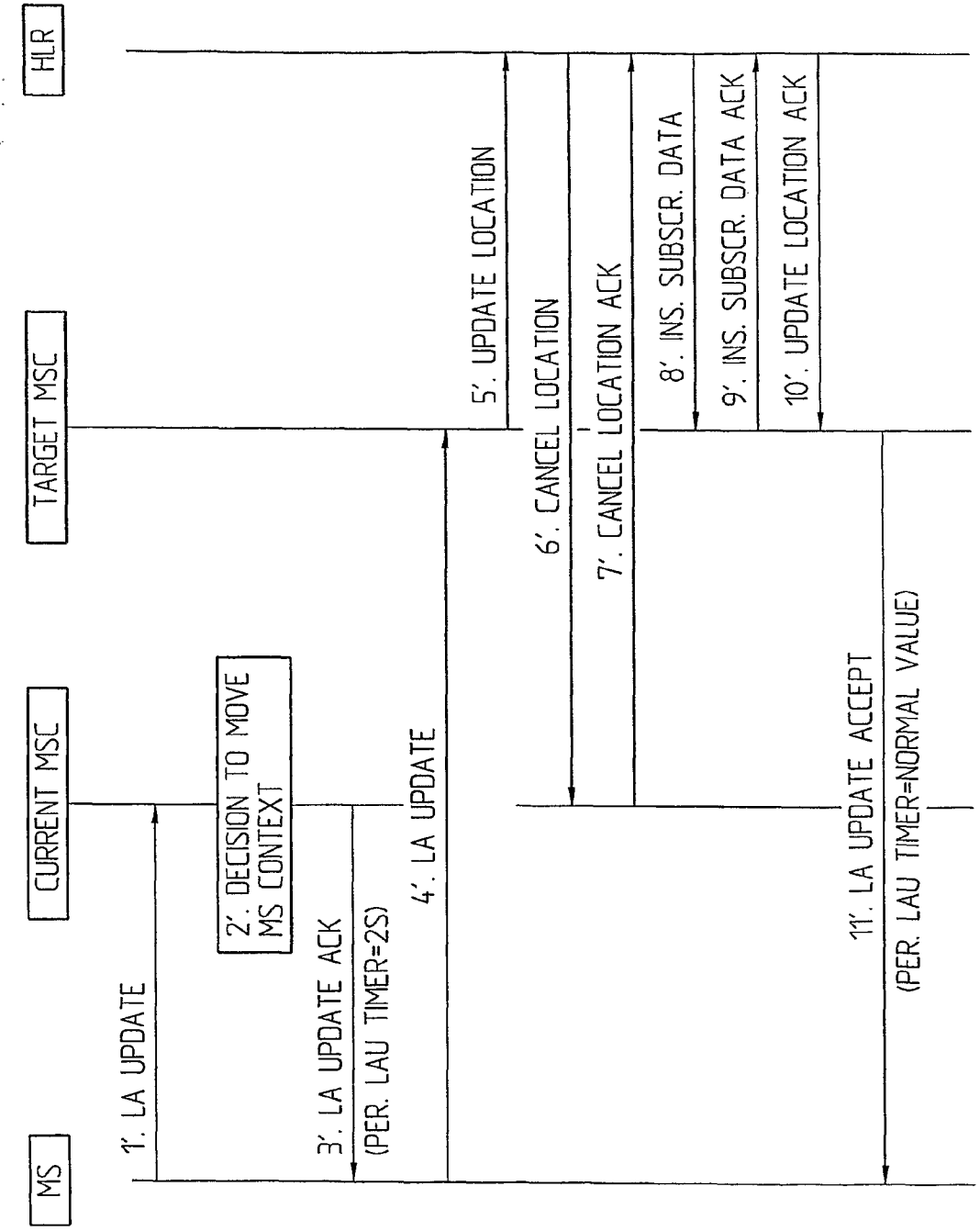
FIG. 5 is a sequence diagram for an implementation with circuit switched traffic.

FIG. 5 is a sequence diagram similar to FIG. 4, but for circuit switched communication.

It should be clear that, for implementation in PS as well as CS communication, the (re)setting of a timer with a short time out is not indispensible, but advantageous.

The different steps are similar from 1'-4', with the difference that it relates to TMSI instead of packet TMSI (P-TMSI), and the terminology is different, here referring to Location Area update etc. However, in this case signalling with HLR (Home Location Register) is required. Actually, also for the PS case signalling with HLR is performed (as given in the 3GPP standards); this is however not illustrated in FIG. 4. Thus, when target MSC has received "Location Area Update", 4' from MS, a message 5', Update Location, is sent from MSC to HLR. Cancel Location message 6' is sent from HLR to current MSC, which sends an acknowledgment to HLR, 7'. HLR then requests target MSC to insert subscriber data, 8', which is acknowledged, 9'. HLR subsequently sends an Update Location Acknowledgment, 10', to target MSC. Target MSC subsequently sends a Location Area update Accept to MS, 11'. In other aspects it is referred to FIG. 4.

Figure 6:
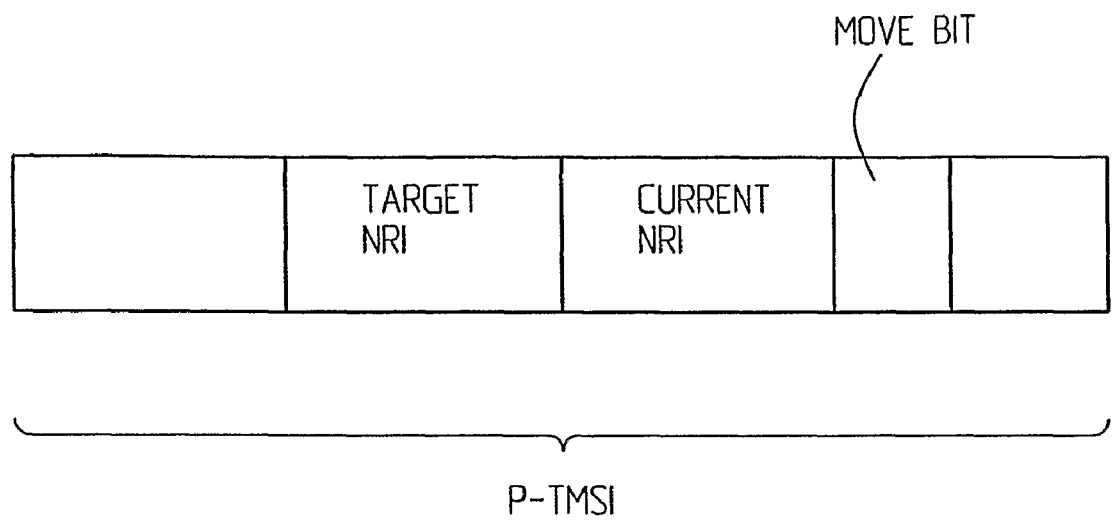
FIG. 6 shows an enhanced or modified P-TMSI in an area update or transfer acceptance message in an implementation of the present invention for PS traffic.

FIG. 6 shows one example of a P-TMSI in an acceptance message generated in a current functional server node. The "move bit" is set in P-TMSI and target NRI is set to the NRI of the second, target, SGSN, (the mobile station is not known in the target SGSN). The NRI of the current SGSN is also included. The remainder of P-TMSI, and the whole acceptance message is preferably provided according to known, standardized manners, cf. e.g. TS 24.008 9.4.15 for GSM/GPRS and for WCDMA.

The target SGSN can then use the transfer indication, e.g. move bit, as an indication that an MS is being moved and look in the P-TMSI to find the NRI of the old (current) SGSN. The NRIs of the other SGSNs in the pool and their corresponding IP addresses are configured in the SGSN (this is a prerequisite to support the GTP Relay functionality). Together, this means that the target SGSN can find the current SGSN and trigger a standardised ISRAU procedure.

The following factors together serve to identify that the signalling received in the target SGSN emanates from a mobile station that was selected in the current SGSN to have its context moved to the new SGSN: the "move bit" is set in the P-TMSI, the target NRI is set to the NRI of the target SGSN but the mobile is not known in the new (target) SGSN. The P-TMSI contains a valid NRI of another (current) SGSN in the SGSN pool in the prescribed position. The incoming periodic RA update signal indicates an RA within the pool area.

In a particularly advantageous embodiment it is possible for the target SGSN to identify an error situation that may occur during a move operation, specifically for GSM. The error that can occur is that the Routing Area Update Complete message from the MS can be routed to the target SGSN. This should not be the normal behaviour, this message should end up in the old (current) SGSN, but due to different interpretations (BSC implementations) of the Gb interface specification, 3GPP, this can happen.

If this occurs, the target SGSN can make sure that a re-attach of the MS is not forced. Normal behaviour may be to trigger a re-attach at receipt of a Routing Area Update Complete message from an unknown MS in the target SGSN which would result in an unnecessary service interruption for the MS and end-user. Due to the presence of the move bit and the target SGSNs NRI in the TTLI (Temporary Logical Link Identifier) this situation can be identified and handled by the target SGSN.

It is an advantage of the invention that through setting the "move bit" and including the NRI of the (old) current SGSN in the P-TMSI of a mobile to trigger an ISRAU in the target (new) SGSN at the next periodic routing area update, unnecessary logic and communication between SGSNs involved in an MS context move operation can be avoided. This is of course also applicable for CGSN:s, MSC:s etc, in split as well as monolithic implementations.

Figure 7:
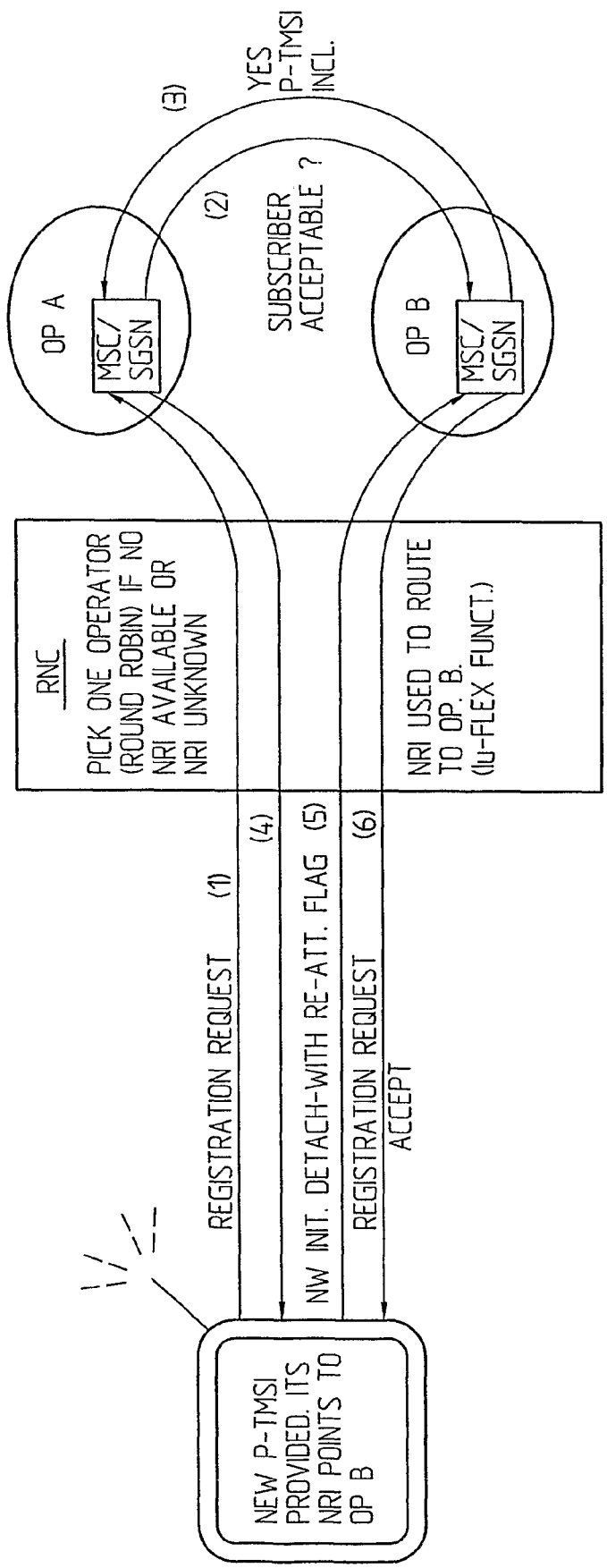
FIG. 7 is a schematical illustration of an implementation in a packet switched, shared network environment.

FIG. 7 is merely included to illustrate an example of a shared network which the inventive concept is applicable. It shows an embodiment with a shared network (shared RAN) in which a mobile station sends a registration request, 1, to RNC. If no NRI is available, or if NRI is unknown, RNC selects one operator (e.g. using Round-Robin). It should be clear that throughout the application it is referred to NRI, a domain selector or similar could alternatively be used (which is signalled from UE MS to RNC). This is applicable for all embodiments. If Operator A cannot register the subscriber, Operator A sends a message to Operator B asking Operator B if Operator B can accept the subscriber, 2. If Operator B accepts, Operator B sends a response message to Operator A including a P-TMSI, 3. This message may also contain other information or parameters, e.g. the address (ID) to the SGSN that later should be used when fetching context etc. An Attach accept with the new P-TMSI, followed by a Network initiated Detach message, with a re-attach flag, is then sent to the terminal station, 4. The terminal station then sends a new registration request, 5, using the received new P-TMSI, which has an NRI pointing to Operator B, why the request is routed by RNC (using NRI, i.e. conventional Iu-flex functionality) to Operator B. (NRIs are coordinated between Operator A and Operator B). Subsequently Operator B sends an Accept message to the terminal station, 6. This is a solution for the packet switched domain, and the handling can be said to be transparent to the RNC.

It can be said to be an CN centric solution which with coordinated NRIs between the Operators implements normal Iu-flex routing in RNC. CN Operator selection is handled by CN in conjunction with the terminal station and there is a CS specific procedure to reallocate TMSI in MS and thereby move it to a new MSC, and a PS specific procedure to reallocate P-TMSI in MS and thereby move it to a new SGSN. There are two alternative ways for MSC/SGSN to obtain TMSI/P-TMSI to a target MSC/SGSN, namely by having a pre-allocated range of TMSIs/P-TMSIs to each cooperating operator, or by introducing new CN-CN signalling to ask cooperating operator's MSC/SGSN if it can accept the subscriber and exchange parameters. The CN Operator selection procedure can also be used for re-distribution of subscribers in a pool from one CN node to another, e.g. at node maintenance or load unbalance, or for other reasons as discussed above.

For such a solution slightly different procedures are to be implemented for packet switched (PS) traffic and for circuit switched (CS) traffic respectively, as illustrated above.

The steps for a PS procedure may be:
If the Initial NAS (Non Access Stratum) (from MS, transparently through RNC to SGSN) message is an Attach request (WCDMA only):
  Get a new P-TMSI (pre-allocated or through signalling).
  Send an Attach accept (temporary) with the new P-TMSI to UE (terminal station).
  Send immediately after a Network initiated Detach request, with re-attach flag set.
  The UE re-attaches using the new P-TMSI (with another NRI). The RNC routes the message to the right SGSN based on the NRI in the P-TMSI.
If the Initial NAS message is an RA Update:
  Get a new P-TMSI with NRI of current and target SGSN node.
  Send an RAU accept with the new P-TMSI to UE. Periodic timer=0 (or any other minimum value).
  Terminal station UE initiates a Periodic RAU, which is routed to the new SGSN (using NRI) and there handled as an Inter-SGSN RAU.

In order to minimize inter-operator signalling for a CN node selection procedure, the MSC/SGSN may be self-learning in what IMSI series are handled by what operators (with time-to-live).

The CS specific procedure for reallocating TMSI, and thereby transfer an MS may comprise the steps of:
  Performing an IMSI analysis in MSC/SGSN and decide from pre-configured data which operator shall handle the subscriber. Telling the UE with TMSI reallocation that it shall use a specific NRI. This NRI is used exclusively for transferring UEs from Operator A to Operator B. Alternatively the NRI of the correct node of Operator B is included.
  With the next periodic Location Update or service-request routing of the UE to Operator B nodes it gets a new TMSI(NRI) so that the "transfer-NRI" will be free for other UEs to be transferred, (unless correct NRI already obtained).

For the circuit switched domain accordingly modified procedures are used. This is however not shown although the inventive concept with advantage can be implemented also in this domain.

Figure 8:
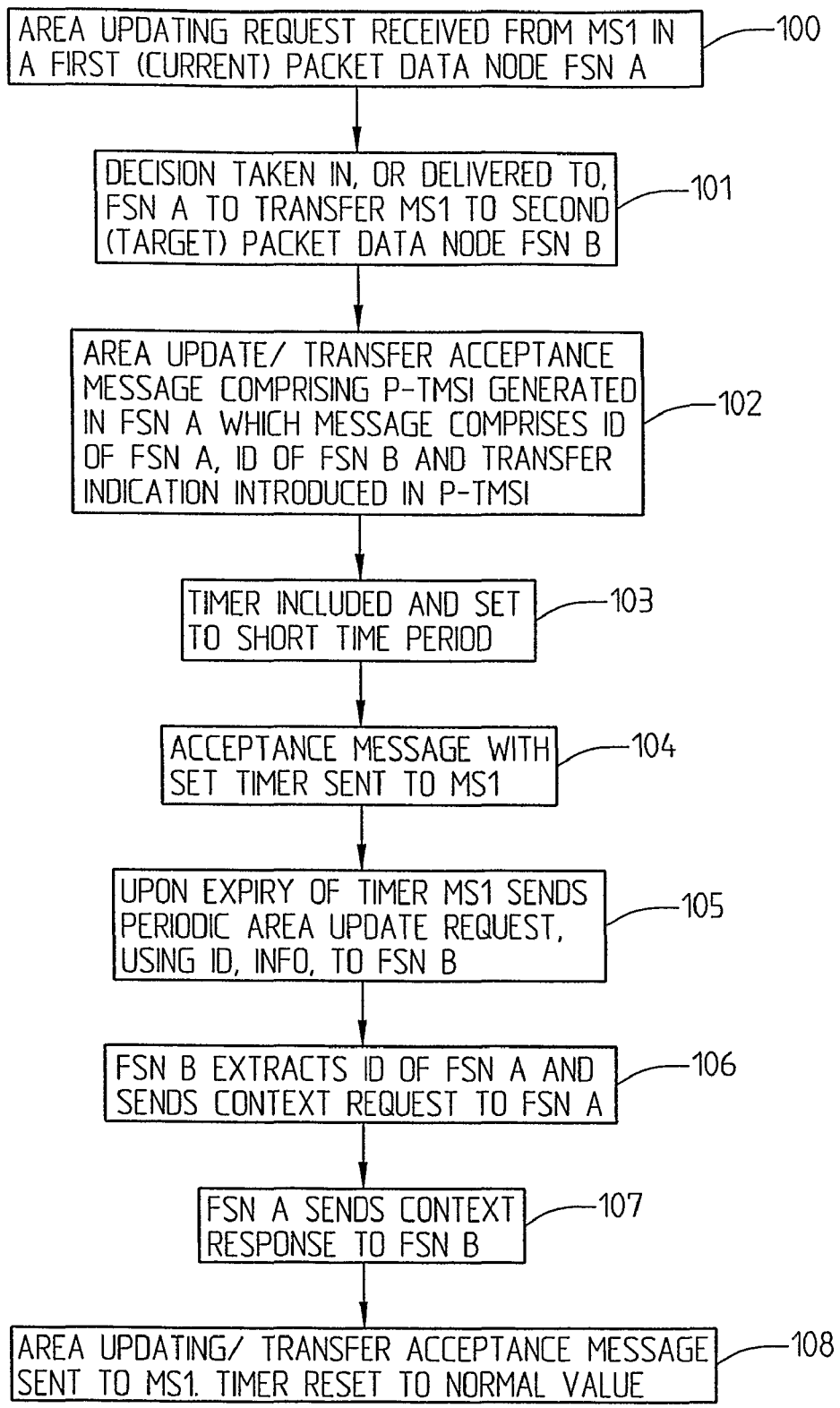
FIG. 8 is a flow diagram describing one implementation of the present invention in a schematical manner.

FIG. 8 essentially describes, in a generalized manner, an embodiment similar to that of FIG. 4 in the form of a flow diagram. Thus, it is supposed that an area updating request is received from MS1 in a first (current) packet data node FSN A, 100. The area updating request is particularly a RAU. It may be (but it does not have to be) a periodic RAU request. Other alternatives are also possible. If a decision is taken, either in FSN A or in means associate therewith, in which case it is supposed that the decision is delivered to FSN A, that MS1 for some reason is to be transferred to another target FSN, here FSN B, 101, an acceptance message consisting of an area update acceptance or a transfer acceptance (e.g. a RAU accept) is provided in FSN A, 102. This message comprises a new P-TMSI of MS1 and it contains an identification (e.g. NRI) of FSN A as well as of FSN B, and in addition thereto a transfer indication.

Preferably a timer is included and set to a low value, much lower than the periodic RAU timer, 103. Most particularly it is the periodic RAU timer that is reset to a low value. (The inclusion of the timer is not indispensible, but clearly advantageous, since it makes MS1 send a periodic routing are update request very soon, e.g. much earlier as provided for though the conventional RAU timer and hence reduces the risk that MS1 moves or takes any action that might jeopardize the transfer operation).

Hence, the acceptance message preferably with the timer with a low value, is sent to MS1 from FSN A, 104. Upon expiry of the timer (if included otherwise at the subsequent, ordinary expiry of the RAU timer) MS1 sends a periodic RAU to TSN 2, 105. The fact that the identification of FSN B is included in the acceptance message makes it possible for MS1 to correctly send the periodic RAU request to FSN B. FSN B upon reception of the periodic RAU request extracts the identification of FSN A from P-TMSI included in the periodic RAU request, 106, and sends a context request (PDP context) to FSN A, 106, in a conventional manner. FSN A returns a context response to FSN B, 107, also in a conventional manner, and finally an area updating/transfer acceptance message is sent from FSN B to MS1, 108, and the ISRAU procedure is completed, i.e. it has been enabled to actually perform a standard ISRAU procedure. If a timer with a low value had been set, this is reset, or the periodic RAU timer is reset to the normal value.

It should be clear that the invention is not limited to the specifically illustrated embodiments, but that it can be varied in a number of ways within the scope of the appended claims. Particularly it is applicable for monolithic as well as split structures, SGSNs as well as on the PS side and e.g. for MSCs on the CS side.

The invention claimed is:

1. An arrangement within a communication system including a number of radio network control means each controlling a number of base stations, to which a number of mobile stations are attached, comprising:
functional server nodes forming part of a conglomerate, or pool, of functional server nodes in common controlling said number of radio network control means, each functional server node being able to control any, or a number of, said radio network control means wherein the functional server nodes support transfer/redistribution of mobile stations or mobile station contexts between each other without interrupting the connection of the mobile station; and
message control means for transferring a mobile station from a first-current-functional server node to a second-target-functional server node, the message control means of said first-current-functional server node are adapted to generate an area update or transfer acceptance message comprising an identification of the first-current-functional server node, an identification of the second-target-functional server node and a transfer indication, and to send said area update or transfer acceptance message to the mobile station.

2. An arrangement according to claim 1, further comprising a timer wherein said timer is set to a second, low, value in said area update or transfer acceptance message, the lapsing of which being adapted to serve as an indication to the mobile station that the mobile station should be adapted to send an area updating request, and in that said area updating request is adapted to be routed to the second-target-functional server node.

3. An arrangement according to claim 2, wherein
the functional server nodes comprise means for detecting, from a received area update request message from a mobile station that the mobile station should be transferred and for extracting the identification of the current functional server node.

4. An arrangement according to claim 3, wherein said second-target-functional server node is adapted to send an area updating acceptance message in response to the area update request message from the mobile station, resetting the timer to a first value, indicating a longer time period than said second timer value.

5. An arrangement according to claim 1, wherein the area or transfer acceptance message comprises a Routing Area Update (RAU) accept message comprising (P-)TMSI for the mobile station.

6. An arrangement according to claim 1, wherein
the identification of the first-current-functional server node comprises the Network Resource Identifier (NRI) of said first-current-functional server node and in that the identification of the second-target-functional server node comprises the Network Resource Identifier (NRI) of said second-target-functional server node.

7. An arrangement according to claim 6, wherein
for the NRI of the second-target-functional server node the conventional position in the (P-) TMSI is adapted to be used whereas for the NRI of the first-current-functional server node a new position in the (P-) TMSI is adapted to be used.

8. An arrangement according to claim 1, wherein the transfer indication comprises a bit setting indication in (P-) TMSI adapted to indicate that the mobile station should be moved from the first-current-functional server node.

9. An arrangement according to claim 1, wherein
the timer comprises a periodic RAU timer.

10. An arrangement at least according to claim 5, wherein a Routing Area Update (RAU) Request received from a mobile station in the first-current-functional server node is adapted to enable or trigger the taking of a decision as to transfer of the mobile station to another-target-functional server node.

11. An arrangement according to claim 10, wherein
the RAU request is a periodic RAU request.

12. An arrangement according to claim 1, wherein
the functional server nodes of a conglomerate or a pool are responsible for all or for a dedicated part of the radio networks, the radio network control means comprising one or more radio network control nodes (RNC, BSC) for each radio network.

13. An arrangement according to claim 1, wherein
the functional server nodes comprise packet data support nodes comprising SGSN/CGSN nodes divided into functional SGSN/CGSN server nodes and media gateway nodes (MGW) or SGSN/CGSN nodes with control and user plane functionalities integrated, or MCSs.

14. An arrangement according to claim 1, wherein the radio networks are UTRANs or BSSs and in that the radio network control means comprises one or more RNCs/BSCs.

15. An arrangement according to claim 1, further comprising:
decision control means for determining whether a mobile terminal station is to be transferred from a current functional server node to another target functional server node within the pool or conglomerate, said control means being externally provided in relation to the functional server node or that the control means comprises a pool/conglomerate supervising arrangement, or that the control means are provided in the functional server node.

16. An arrangement according to claim 15, wherein the control means comprises shared radio network control means.

17. An arrangement according to claim 1, wherein the functional server node acting as a target node is adapted to use the requesting, current functional server node identification for context request messages.

18. An arrangement according to claim 1, is adapted to be used in a GSM/GPRS communications system.

19. An arrangement according to claim 1, is adapted to be used in UMTS.

20. An arrangement according to claim 1, wherein a current functional server node is adapted to request transfer of one, more or all mobile terminal stations connected to it.

21. An arrangement according to claim 20, is adapted to implement scheduled transfer.

22. An arrangement according to claim 20, wherein For transfer of a plurality of mobile terminal stations, means are adapted to be responsible for requesting transfer to several, different target functional server nodes in order to assist in load sharing among functional server nodes.

23. A functional server node forming part of a conglomerate, or pool, of functional server nodes in common controlling a number of radio network control means, said functional server node being able to control any, or a number of, radio network control means, to which mobile terminal stations are connected, comprising:
said functional server node is adapted to support transfer/redistribution of mobile stations or mobile station contexts to/from other functional server nodes without the connection of the mobile stations being interrupted,
decision control means for receiving, or generating, a decision to transfer a mobile station from a current-functional server node to another target functional server node,
message control means for, when a transfer decision is received/taken, generating an area update or transfer acceptance message comprising an identification of said current functional server node itself, an identification of the another target functional server node and a transfer indication, and for sending said message to the mobile station, and
means for detecting such a message from another functional server node in its function as a target functional server node.

24. A functional server node according to claim 23, wherein
the message control means comprises means for setting a timer, lapse of said timer being adapted to activate or trigger the sending of a area updating request, from the mobile station to the target functional server node.

25. A functional server node according to claim 23, further comprising an SGSN, a CGSN comprising the functionalities of an SGSN and a GGSN, in a split or monolithic architecture, or an MSC.

26. A functional server node according to claim 23, wherein
the area or transfer acceptance message comprises a Routing Area Update (RAU) accept message comprising (P-)TMSI for the mobile station.

27. A functional server node according to claim 26, wherein
the identification of the current functional server node comprises the Network Resource Identifier (NRI) of said current functional server node and in that the identification of the another target functional server node comprises the Network Resource Identifier (NRI) of said another target functional server node.

28. A functional server node according to claim 26, wherein
the transfer indication comprises a bit setting in (P-)TMSI indicating that the mobile station should be moved, from said current functional server node.

29. A method for transferring a number of mobile station contexts from a current functional server node forming part of a conglomerate or a pool of functional server nodes in common controlling a number of radio network control means, wherein each functional server node is able to control any, or a number of, radio network control means, to another, target, functional server node of the conglomerate/pool, characterized in that it comprises the steps of:
receiving an area updating request from a mobile station within the pool/conglomerate area in a first-current-functional server node;
generating, or receiving, in the first-current-functional server node, a decision to transfer the mobile terminal station to another-target-functional server node,
generating, in the first-current-functional server node, an area update or transfer acceptance message comprising an identification of the first-current-functional server node, an identification of the another-target-functional server node, and a transfer indication, setting a timer to a given value,
sending the area update or transfer acceptance message to the mobile station,
sending of an area updating request including the information of the area update or transfer acceptance message from the mobile station upon lapse of the timer to the another-target-functional server node using the identification thereof in the area update or transfer acceptance message, or
awaiting a message relating to a predetermined relevant action taken by the mobile station,
sending an information request from the target functional server node to the current functional server node using the identification information received in the area updating request or other message relating to a predetermined action from the mobile station,
returning an information response to the another-target-functional server node,
returning a transfer acceptance from the another-target-functional server node to the mobile station.

30. A method according to claim 29, wherein
the functional server nodes comprises SGSNs or CGSNs in a monolithic architecture or SGSN or CGSN server means in a split architecture.

31. A method according to claim 29, wherein
the identification information comprises NRI both of the current and the target functional server nodes respectively, that the acceptance message comprises a RAU accept message and that the information request comprises a SGSN Context Request and in that the information response comprises an SGSN Context Response.

32. A method according to claim 29, wherein
the functional server nodes comprises MSCs.

33. A method according to claim 29, wherein
it is used in a system comprising a number of operators sharing at least some Radio Networks/Radio Network Control means (RNC, BSC).

\* \* \* \* \*

UNITED STATES PATENT AND TRADEMARK OFFICE
CERTIFICATE OF CORRECTION

PATENT NO.           : 8,018,909 B2
APPLICATION NO.      : 11/574486
DATED                : September 13, 2011
INVENTOR(S)          : Ahlen et al.

It is certified that error appears in the above-identified patent and that said Letters Patent is hereby corrected as shown below:

In Column 4, Line 64, delete "neworks" and insert -- networks --, therefor.

In Column 8, Line 63, delete "Resourse" and insert -- Resource --, therefor.

In Column 14, Line 51, in Claim 10, delete "Request" and insert -- request --, therefor.

In Column 15, Line 35, in Claim 22, delete "For" and insert -- for --, therefor.

In Column 15, Line 56, in Claim 23, delete "node itself," and insert -- node, --, therefor.

Signed and Sealed this
Sixth Day of March, 2012

David J. Kappos
*Director of the United States Patent and Trademark Office*